United States Patent [19]

Folkins et al.

[11] Patent Number: 5,537,190
[45] Date of Patent: Jul. 16, 1996

[54] METHOD AND APPARATUS TO IMPROVE REGISTRATION IN A BLACK FIRST PRINTING MACHINE

[75] Inventors: Jeffrey J. Folkins, Rochester; Daniel W. Costanza, Webster, both of N.Y.

[73] Assignee: Xerox Corporation, Stamford, Conn.

[21] Appl. No.: 354,305

[22] Filed: Dec. 12, 1994

[51] Int. Cl.$^6$ ................................................ G03G 21/00
[52] U.S. Cl. .................... 355/214; 355/208; 355/246; 355/326 R
[58] Field of Search ........................ 355/326 R, 327, 355/208, 214, 203, 204, 246; 347/115, 116

[56] References Cited

U.S. PATENT DOCUMENTS

| | | | |
|---|---|---|---|
| 4,804,979 | 2/1989 | Kamas | 347/116 |
| 4,903,067 | 2/1990 | Murayama et al. | 347/129 |
| 4,916,547 | 4/1990 | Katsumata et al. | 358/300 |
| 4,963,899 | 10/1990 | Resch, III | 347/116 |
| 4,965,597 | 10/1990 | Ohigashi et al. | 347/118 |
| 5,227,815 | 7/1993 | Dastin et al. | 355/208 X |
| 5,287,162 | 2/1994 | deJong et al. | 355/326 R |
| 5,394,223 | 2/1995 | Hart et al. | 355/208 X |

*Primary Examiner*—Matthew S. Smith
*Attorney, Agent, or Firm*—Kevin R. Kepner

[57] ABSTRACT

A method and apparatus for achieving optimum optical contrast for detecting registration marks in a multicolor print black first color electrophotographic printing machine. A black mask having voids in the shape of a registration mark is formed on the photoreceptor. A high contrast color is then overwritten on the mask forming marks which indicate the position of the black image. A second method utilizes only the first recharge unit and the last developer unit. A registration mark is imaged by each imager and all of the latent image registration marks are developed with a single color high contrast toner. A sensor is then used to determine the relative position of the various color imagers and to send signals to the controller to make appropriate corrections.

12 Claims, 3 Drawing Sheets

METHOD AND APPARATUS TO IMPROVE REGISTRATION IN A BLACK FIRST PRINTING MACHINE

This invention relates generally to the registration of color images in a color image output terminal (IOT), and more particularly concerns an improved color image alignment system utilizing an improved method for providing optimum optical contrast for detecting registration marks in full color electrophotographic printing machines.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

The foregoing generally describes a typical black and white electrophotographic printing machine. With the advent of multicolor electrophotography, it is desirable to use an architecture which comprises a plurality of image forming stations. One example of the plural image forming station architecture utilizes an image on image system in which the photoreceptive member is recharged, reimaged and developed for each color separation. This charging, imaging, developing and recharging reimaging and developing is usually done in a single revolution of the photoreceptor as compared with multipass architectures which allow image on image to be achieved with a single charge, recharge system and imager, etc.. This architecture offers a high potential for throughput and image quality.

In order to deliver good quality images, strict specifications are imposed on the accuracy with which the color image output terminal superimposes the various color separations which compose the individual images. This juxtaposition accuracy is often called registration. In the trade, a limit of 125 micrometers is considered a maximum for acceptable misregistration errors of quality pictorial color images and a 75 micrometer limit is often imposed as a limit by the manufacturers of top quality equipment. Some imaging techniques require registration accuracy of 15 micrometers for pictorial information. An accuracy of 35 micrometers is typically required for the printing of fine colored text. These numbers represent the diameter of a circle which would encompass all supposedly homologous color dots.

One common way of improving registration is described in U.S. Pat. No. 4,903,067 to Murayama et al. Murayama et al. employ a marking system with a detector for measuring alignment errors and mechanically move individual color printers to correct misalignment.

Color printers that employ marks produced by each of the constituent colors in juxtaposition with each other enable correction of lateral and longitudinal relative position, skew and magnification. The marks may be machine readable, and data may be processed to measure registration errors for the purpose of automating registration error correction. However, such corrections cannot compensate for the errors introduced by mismatch in the velocity variations of the photoreceptors because these errors differ both in phase and magnitude and are in no way steady or synchronous with the image transfer pitch. For example, a photoreceptor drum characterized by an eccentricity and wobble may rotate with an instantaneous rotational velocity that repeatably varies as a function of the rotational phase angle such that an average rotational velocity over a complete rotation would inaccurately characterize the instantaneous rotational velocity at any single rotational phase angle.

Measurement of the position of each of the registration marks may be accomplished by illuminating the marks and employing a lens to collect the diffusely reflected light to image the reflection on photodetectors or photodetector arrays. The illumination may be in the visible wavelength or at near infrared (IR) wavelength. In order to reliably detect the position of the registration mark, the diffuse reflection from the registration mark must be significantly different from its background. It is desirable therefore, to achieve high contrast particularly for black (as opposed to colored) separations in which the contrast between the black toner particles and the photoreceptor belt is low. Typically, black toner has poor contrast with a photoreceptor member while colored toners usually have good contrast dependent, of course, on the wavelength of the light source.

The following disclosures may be relevant to various aspects of the present invention:

U.S. Pat. No. 4,965,597 Patentee: Ohigashi et al.
Issued: Oct. 23, 1990

U.S. Pat. No. 4,963,899 Patentee: Resch,III Issued:
Oct. 16, 1990

U.S. Pat. No. 4,916,547 Patentee: Katsumata et al.
Issued: Apr. 10, 1990

U.S. Pat. No. 4,903,067 Inventor: Murayama et al.
Issue Date: Feb. 20, 1990

U.S. Pat. No. 4,804,979 Patentee: Kamas et al.
Issued: Feb. 14, 1989

U.S. Pat. No. 5,287,162 Patentee: de Jong et al. Issued: Feb. 15, 1994

U.S. Pat. No. 08/168,300 Inventor: Castelli et al.
Filing Date: Dec. 17, 1993

The relevant portions of the foregoing disclosures may be briefly summarized as follows:

U.S. Pat. No. 4,965,597 discloses a color image recording apparatus which superimposes a plurality of different color images on one another to form a composite image. Registration marks are formed on a recording medium and are sensed at each station to assure a clear and accurate superimposed image. A sensor senses one or both edges of a recording medium to note image deviations caused by transport to enable compensation thereof.

U.S. Pat. No. 4,963,899 discloses a method and apparatus for image frame registration in which registration indicia for registering an image frame are written on a photosensitive member in an interframe or frame margin area. A sensor array provides in-track and cross-track signal information to a control unit for synchronizing the electrostatic process of the registered image frames.

U.S. Pat. No. 4,916,547 discloses a color image forming apparatus which produces a single composite color image on a paper. The paper is transported by a belt and the composite color image is formed by transferring image components of different colors to the paper in register with each other. The apparatus reduces positional deviation of a plurality of image components of different colors by sensing signals on a surface of the transfer belt outside a paper region. The sensor senses arriving pattern images and corrects for unaligned images by calculating a deviation amount and adjusting a timing signal accordingly.

U.S. Pat. 4,903,067 discloses an apparatus having multiple image forming devices and a correcting scheme to correct positional deviations of the images so that the images can be accurately transferred to a sheet based upon matching position registration marks.

U.S. Pat. No. 4,804,979 discloses a single pass color printer/plotter having four separate microprocessor-based print stations, each for printing a different color image for superimposition with one another to form a full color image. The printer includes a registration system where each print station monitors registration marks to correct for media variations. Each print station includes optical sensors that monitor the marks printed on the media edge to synchronize the printing and align the images properly.

U.S. Pat. No. 5,287,162 describes a system including a marking device for applying to a process medium a first chevron from a first printer, a second chevron from a second printer and a third chevron from both the first printer and the second printer, the third chevron having a first element applied from the first printer and a second element applied from the second printer. The detection system further includes a detection device for detecting a matrix of times including three pluralities of times, each of the three pluralities of times corresponding to a respective time of passage of the first, second and third chevrons by the detection device. The detection system further includes a determining device for determining the alignment error based on a function of the three pluralities of times. A control system includes a marking device for applying to a process medium a first chevron from a first printer, a second chevron from a second printer and a third chevron from both the first printer and the second printer. The control system further includes a detection device for detecting a matrix of times including three pluralities of times, each of the three pluralities of times corresponding to a time of passage of a respective one of the first, second and third chevrons by the detection device, a determining device for determining an alignment error based on a function of the matrix of times, and a control device for minimizing the alignment error.

U.S. application No. 08/168,300 describes a method of achieving optimum optical contrast for detecting registration marks in a multicolor electrophotographic printing machine. The reflectivity of the image carrying member which is usually an intermediate transfer belt is determined. The reflectivity of each of the toners is then determined. If one of the toners has a contrasting reflectivity, while the remaining toners do not contrast then a uniform field of the contrasting toner is imaged and developed and the registration marks for the other toner colors are then developed on top of the uniform field. A void in the field in the shape of the other toner marks is used as the registration mark for the contrasting toner.

In accordance with one aspect of the present invention, there is provided a method of achieving optical contrast between an image carrying media and a plurality of marking materials. The method comprises imaging a first pattern having a geometric shape onto the image carrying media and developing the first imaged pattern with black toner. The steps of imaging a second pattern at least partially on top of the first imaged pattern and developing the second pattern with toner particles other than black particles to create a high contrast representative of the relative registration between the first pattern and the second pattern are also provided.

Pursuant to another aspect of the present invention, there is provided a color electrophotographic printing machine. The machine comprises an image carrying media, a first imager to record a latent image on the image carrying media and a first developer to deposit black toner particles on the first latent image to create a black mask. A second imager to create a second latent image at least partially superimposed on the first developed image on the image carrying media, a second developer to deposit color toner of a color other than black on the second latent image and a sensor which determines the position of the black image as a function of the second color developed image and generates a signal indicative thereof are also provided.

Pursuant to yet another aspect of the present invention, there is provided a method of achieving registration data by optical contrast measurements between an image carrying media having and a plurality of marking materials. The method comprises writing a first geometric pattern with a black imaging source, writing a second geometric pattern with a non-black imaging source and developing the first geometric pattern and the second geometric pattern with non-black toner. The step of determining the relative position of the first geometric pattern and the second geometric pattern is also performed.

Other features of the present invention will become apparent as the following description proceeds and upon reference to the drawings, in which.

This invention relates to an imaging system which is used to produce an image on image color output in a single revolution or pass of a photoreceptor belt. It will be understood, however, that it is not intended to limit the invention to the embodiment disclosed. On the contrary, it is intended to cover all alternatives, modifications and equivalents as may be included within the spirit and scope of the invention as defined by the appended claims, including a multiple pass image on image color process system, and a single or multiple pass highlight color system.

Figure 5:
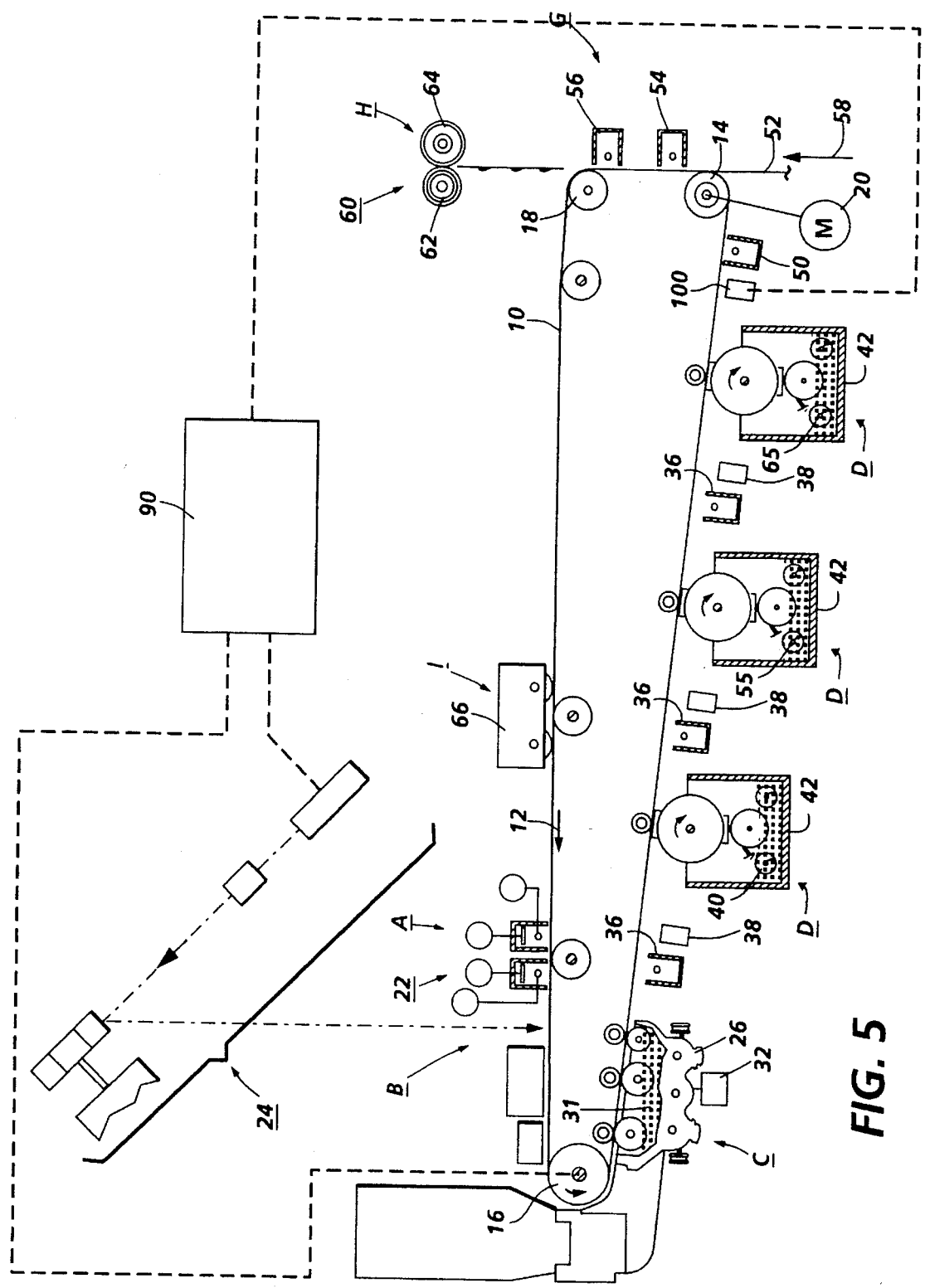
FIG. 5 is a schematic diagram of a four color image output terminal utilizing the contrast scheme of the present invention.

Turning now to FIG. 5, the electrophotographic printing machine of the present invention uses a charge retentive surface in the form of an Active Matrix (AMAT) photoreceptor belt 10 supported for movement in the direction indicated by arrow 12, for advancing sequentially through the various xerographic process stations. The belt is entrained about a drive roller 14 and two tension rollers 16 and 18 and the roller 14 is operatively connected to a drive motor 20 for effecting movement of the belt through the xerographic stations.

With continued reference to FIG. 5, a portion of belt 10 passes through charging station A where a corona generating device, indicated generally by the reference numeral 22, charges the photoconductive surface of belt 10 to a relative high, substantially uniform, preferably negative potential.

Next, the charged portion of photoconductive surface is advanced through an imaging station B. At exposure station B, the uniformly charged belt 10 is exposed to a laser based output scanning device 24 which causes the charge retentive surface to be discharged in accordance with the output from the scanning device. Preferably the scanning device is a laser Raster Output Scanner (ROS). Alternatively, the ROS could be replaced by other xerographic exposure devices such as LED arrays.

The photoreceptor, which is initially charged to a voltage $V_0$, undergoes dark decay to a level $V_{ddp}$ equal to about −500 volts. When exposed at the exposure station B it is discharged to $V_{background}$ equal to about −50 volts. Thus after exposure, the photoreceptor contains a monopolar voltage profile of high and low voltages, the former corresponding to charged areas and the latter corresponding to discharged or background areas.

At a first development station C, a magnetic brush developer structure, indicated generally by the reference numeral 26 advances insulative magnetic brush (IMB) material 31 into contact with the electrostatic latent image. The development structure 26 comprises a plurality of magnetic brush roller members. These magnetic brush rollers present, for example, charged black toner material to the image areas for development thereof. Appropriate developer biasing is accomplished via power supply 32.

A corona recharge device 36 having a high output current vs. control surface voltage (IN) characteristic slope is employed for raising the voltage level of both the toned and untoned areas on the photoreceptor to a substantially uniform level. The recharging device 36 serves to recharge the photoreceptor to a predetermined level.

A second exposure or imaging device 38 which may comprise a laser based input and/or output structure is utilized for selectively discharging the photoreceptor on toned areas and/or bare areas, pursuant to the image to be developed with the second color developer. At this point, the photoreceptor contains toned and untoned areas at relatively high voltage levels and toned and untoned areas at relatively low voltage, levels. These low voltage areas represent image areas which are developed using discharged area development (DAD). To this end, a negatively charged, developer material 40 comprising color toner is employed. The toner, which by way of example may be yellow, is contained in a developer housing structure 42 disposed at a second developer station D and is presented to the latent images on the photoreceptor by a of a magnetic brush developer roller. A power supply (not shown) serves to electrically bias the developer structure to a level effective to develop the DAD image areas with negatively charged yellow toner particles 40.

The above procedure is repeated for a third imager for a third suitable color toner such as magenta and for a fourth imager and suitable color toner such as cyan. In this manner a full color composite toner image is developed on the photoreceptor belt.

To the extent to which some toner charge is totally neutralized, or the polarity reversed, thereby causing the composite image developed on the photoreceptor to consist of both positive and negative toner, a negative pre-transfer dicorotron member 50 is provided to condition the toner for effective transfer to a substrate using positive corona discharge.

Subsequent to image development a sheet of support material 52 is moved into contact with the toner images at transfer station G. The sheet of support material is advanced to transfer station G by conventional sheet feeding apparatus, not shown. Preferably, the sheet feeding apparatus includes a feed roll contacting the uppermost sheet of a stack copy sheets. The feed rolls rotate so as to advance the uppermost sheet from stack into a chute which directs the advancing sheet of support material into contact with photoconductive surface of belt 10 in a timed sequence so that the toner powder image developed thereon contacts the advancing sheet of support material at transfer station G.

Transfer station G includes a transfer dicorotron 54 which sprays positive ions onto the backside of sheet 52. This attracts the negatively charged toner powder images from the belt 10 to sheet 52. A detack dicorotron 56 is provided for facilitating stripping of the sheets from the belt 10.

After transfer, the sheet continues to move, in the direction of arrow 58, onto a conveyor (not shown) which advances the sheet to fusing station H. Fusing station H includes a fuser assembly, indicated generally by the reference numeral 60, which permanently affixes the transferred powder image to sheet 52. Preferably, fuser assembly 60 comprises a heated fuser roller 62 and a backup or pressure roller 64. Sheet 52 passes between fuser roller 62 and backup roller 64 with the toner powder image contacting fuser roller 62. In this manner, the toner powder images are permanently affixed to sheet 52 after it is allowed to cool. After fusing, a chute, not shown, guides the advancing sheets 52 to a catch tray, not shown, for subsequent removal from the printing machine by the operator.

After the sheet of support material is separated from photoconductive surface of belt 10, the residual toner particles carried by the non-image areas on the photoconductive surface are removed therefrom. These particles are removed at cleaning station H using a cleaning brush structure contained in a housing 66.

It is believed that the foregoing description is sufficient for the purposes of the present application to illustrate the general operation of a color printing machine.

Turning now to FIGS. 1–4 inclusive, there is illustrated the configurations of belt and toner reflectivity for which the methods described herein provide optimum optical contrast. The methods described herein are applicable to any geometric form of registration mark and a variety of different types of photodetectors. For clarity and convenience, the schemes will be described in terms of chevron marks and bicell detectors such as those described in U.S. Pat. No. 5,287,162, the pertinent portions of which are herein incorporated by reference.

In each case discussed below the desired geometric shape is imaged onto the photoreceptor belt 10. The bicell detectors 100 are of the type which are divided into subsections comprising known photoemitter/photosensor pairs. Preferably, the emitter/sensor pair is in close proximity because the reflected light pattern is more precisely detected by such a device. The output of the emitter/sensor pair corresponds to the degree of reflectivity of the mark being sensed and can also determine the degree of reflectivity of the background material.

The reflectivity of each color toner as well as the image receiving medium (photoreceptor belt) will be determined and utilized to control the method described. The shape of the pattern imaged is controlled by controller 90. The pattern may be of any geometric shape and may be contiguous or noncontiguous. The output signal of the detectors 100 is then received by the controller 90 and the degree of reflectivity of each toner and the belt 10 is determined. The reflectivity determination should be performed at the time a machine is built and can be repeated whenever a toner supply or belt is changed to set sensor levels to assure that the optimum optical contrast is being maintained. The discussion has been primarily directed to a dry toner process, however, is equally adaptable to a process using liquid toner development in which accurate registration parameters must be maintained.

Figure 1:
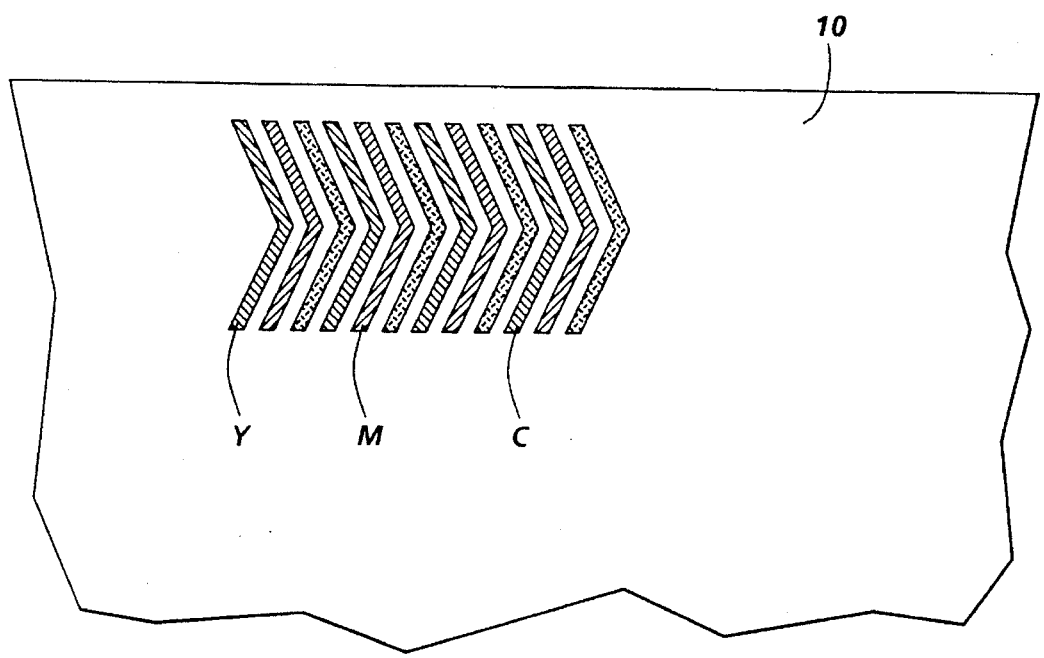
FIG. 1 shows a pattern arrangement for using the present invention for contrasting the belt and the multicolor toners under a first set of conditions in which black toner is not developed.

Turning next to FIG. 1, there is illustrated a section of a photoreceptor belt having registration marks in the pattern of a chevron imaged and developed thereon. The marks illustrated are representative of a yellow, magenta and cyan arrangement in which the toners contrast with the background photoreceptor belt. It has been determined that in a high quality image on image printing machine, it is necessary to have black first imaging and development for image quality purposes. A problem arises with respect to sensing a black registration mark in that the diffuse reflectivity of the black image is typically low and the typical marks on belt sensor does not readily distinguish between the black registration marks and the non-imaged and undeveloped sections of the photoreceptor.

Figure 2:
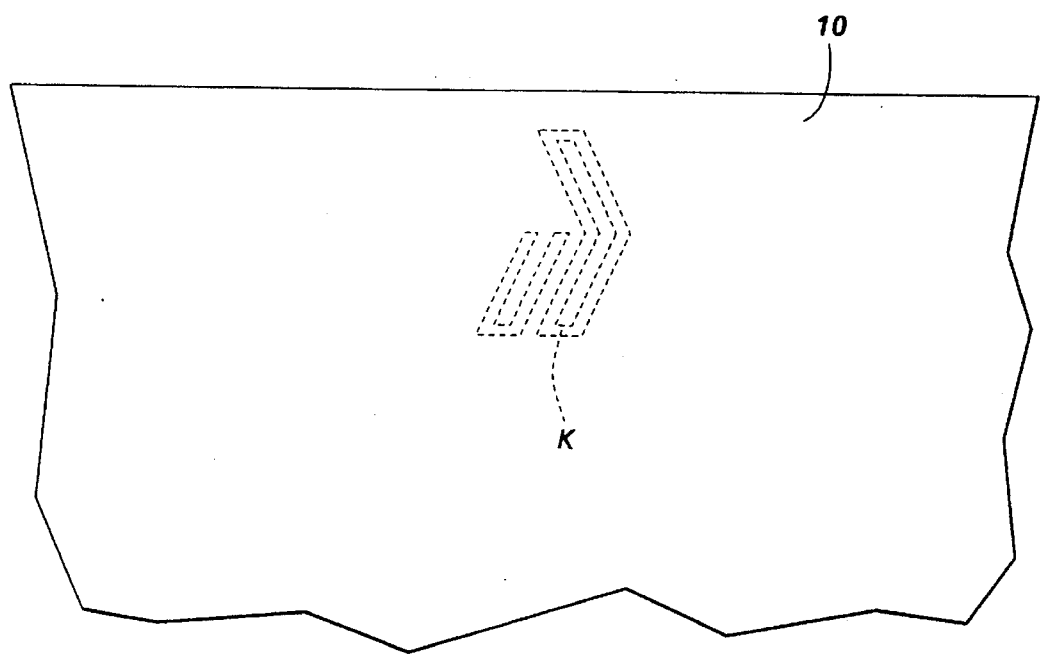
FIG. 2 shows a pattern arrangement for demonstrating the noncontrasting black on belt mask.
Figure 3:
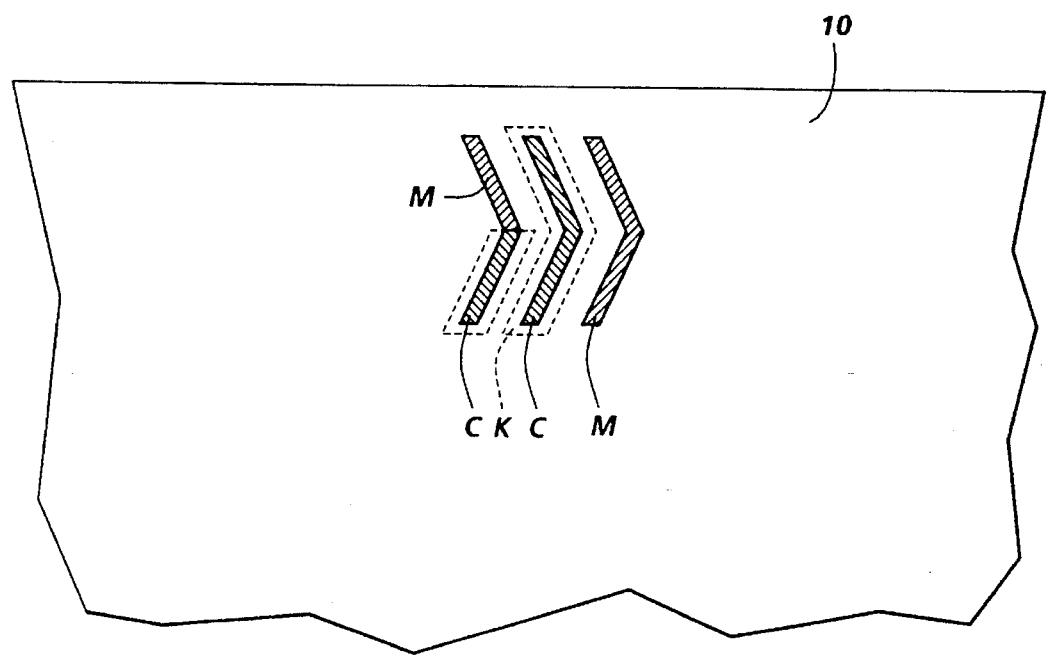
FIG. 3 shows the overwritten FIG. 2 mask according to the invention herein.

FIGS. 2 and 3 illustrate a method and apparatus in which a black mark can be created that will be sensed by a marks on belt sensor so that the registration can be accomplished between the black imager and the subsequent yellow, magenta, and cyan imagers for proper color separation. As illustrated in FIG. 2, initially a mask of black toner can be created having voids corresponding to the same shape as the colored registration marks illustrated in FIG. 1. A color imager and developer can then be used to overlay a pattern on top of the black mask to create colored marks in the voids in the black mask as illustrated in FIG. 3, the colored marks being readable by the marks on belt type sensor. As shown there is a reference mark imaged and developed in a first color, magenta as shown, and the highlight mark (cyan) to indicate the boundary of the black mask. Of course a single color could also be used for both the reference and the highlight marks. It is the nature of the black first image on image printer that the color imaging on top of the black image will not be developed due to the laser exposure being absorbed by the black toner and because the corresponding voltages will reduce development in the area of the black. Thus, the mask of black development will inhibit color development anywhere except within the void area.

A delay time measurement between a non-mask color line and the color cutout in the black mask will then give the relative registration between the black and color imagers. Additionally, the transition from the overwritten toner to the black background is the same sense (the mark is more reflective than the background) as the other toner marks with respect to the plain belt and therefore makes design of the sensor electronics simpler and more straightforward.

Figure 4:
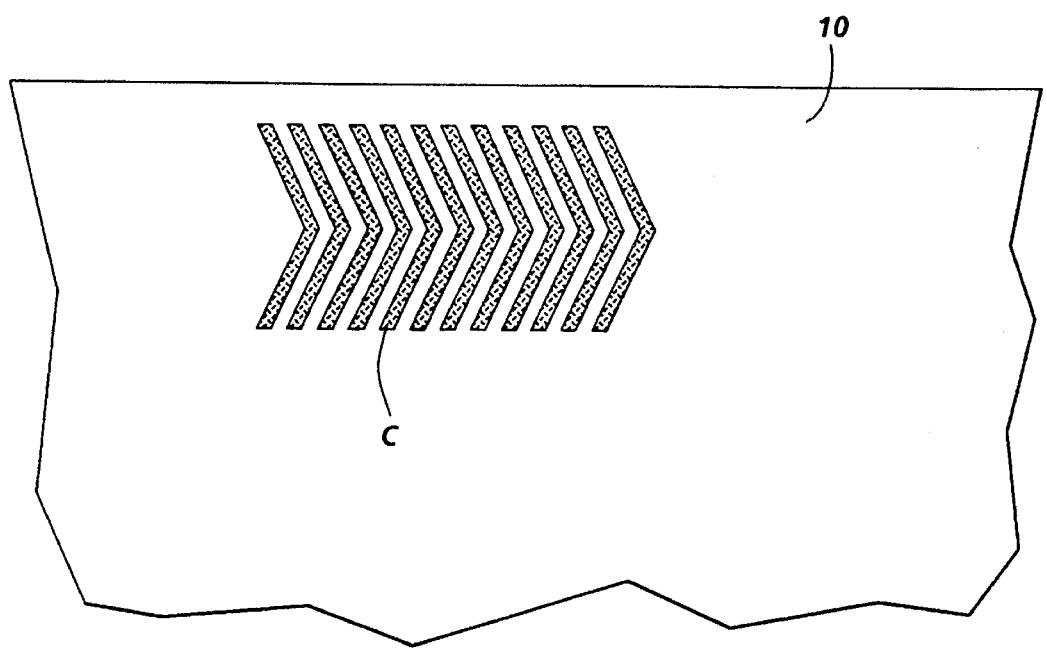
FIG. 4 shows a pattern arrangement for using the calibration scheme of the present invention for multi imaging/same color development.

A second scheme to determine the relative positions of the black and other color imagers is illustrated in FIG. 4. This scheme requires that all but the first recharger and all but the last developer housing which is other than black be turned off in a calibration cycle to determine the relative positions of the black and color imagers. The registration marks are then imaged on the photoreceptor belt by each imager as the belt passes the respective imaging station. Only the last developer housing, however, (in the example set forth above, the cyan developer) is turned on and used to develop all of the imaged marks at the same time. When all of the imaged registration marks are then developed with the single color toner, chosen so that a high contrast is provided between the toner and the photoreceptor belt, the marks on belt sensor can measure the position and location of each of the marks relative to one another. Based on the sensor output, timing of the system skew, etc., can be adjusted to obtain correct color-to-color registration. This scheme requires that the registration be performed in a calibration type cycle due to the necessity of turning off all but the first recharger and all but the last developer housing. However, it is a useful technique for initial machine setup and/or after replacement of any major subsystem component in the printing machine.

Utilizing either of the above measurement schemes the imaging source can be adjusted based upon the sensor input so that proper image registration is achieved. In addition, the image carrying media, in the illustrated example the photoreceptor belt, can be adjusted to achieve the proper image registration.

In recapitulation, there is provided a method and apparatus for achieving optimum optical contrast for detecting registration marks in a multicolor, print black first image on image electrophotographic printing machine. A black registration mark is formed on the photoreceptor. A high contrast color is then partially overwritten on the black image. A second method utilizes only the first recharge unit and the last developer unit. A registration mark is imaged by each imager and all of the latent image registration marks are developed with a single color high contrast toner. A sensor is then used to determine the relative position of the various color imagers and to send signals to the controller to make appropriate corrections.

It is, therefore, apparent that there has been provided in accordance with the present invention, a method of achieving toner and belt contrast for registration detectors that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method of achieving optical contrast between an image carrying media and a plurality of marking materials, comprising:

imaging a first pattern having a geometric shape onto the image carrying media;

developing the first imaged pattern with black toner;

imaging a second pattern at least partially on top of the first imaged pattern; and developing the second pattern with toner particles other than black particles to create a high contrast representative of the relative registration between the first pattern and the second pattern.

2. The method according to claim 1, further comprising:

sensing the positions of the first imaged and developed pattern and the second imaged and developed pattern of toner; and adjusting the position of an imaging source accordingly so as to register the first imaged and developed pattern and the second imaged and developed pattern to create multi-color images.

3. The method according to claim 1, wherein the first imaged pattern has a geometric void formed therein and the second pattern is developed in the geometric void of the first imaged and developed pattern.

4. The method according to claim 1, further comprising depositing a plurality of powder marking particles on the image carrying media.

5. The method according to claim 1, further comprising depositing a plurality of liquid marking particles on the image carrying media.

6. The method according to claim 1, further comprising:

sensing the relative positions of the first imaged and developed pattern and the second imaged and developed pattern of toner; and adjusting the position of the image carrying media accordingly so as to register the first imaged and developed pattern and the second imaged and developed pattern to create multi-color images.

7. A color electrophotographic printing machine, comprising:

an image carrying media;

a first imager to record a first latent image on said image carrying media;

a first developer to deposit black toner particles on the first latent image to develop as a first developed image a black geometric mask;

a second imager to create a second latent image at least partially superimposed on the first developed image on the image carrying media;

a second developer to deposit color toner of a color other than black on the second latent image to create a second color developed image; and a sensor which determines the position of the black mask as a function of the second color developed image and generates a signal indicative thereof.

8. An apparatus according to claim 7, further comprising a controller which receives the signal generated by said sensor and adjusts said first imager as a function of the received signal to provide proper image registration.

9. An apparatus according to claim 7, further comprising a controller which receives the signal generated by said sensor and adjusts said image carrying media as a function of the received signal to provide proper image registration.

10. A method of achieving registration data by optical contrast measurements between an image carrying media and a plurality of marking materials, comprising:

writing a first geometric pattern with a black imaging source;

writing a second geometric pattern with a non-black imaging source;

developing both the first geometric pattern and the second geometric pattern with non-black toner; and determining the relative position of the first geometric pattern and the second geometric pattern.

11. A method according to claim 10, further comprising:

writing a third geometric pattern with a non-black imaging source;

developing the third geometric pattern with non-black toner; and determining the relative position of the first geometric pattern, the second geometric pattern and the third geometric pattern.

12. A method according to claim 11, further comprising:

writing a fourth geometric pattern with a non-black imaging source;

developing the fourth geometric pattern with non-black toner particles; and determining the relative position of the first geometric pattern, the second geometric pattern, the third geometric pattern and the fourth geometric pattern.

* * * * *